US010296321B2

(12) United States Patent
Liu et al.

(10) Patent No.: US 10,296,321 B2
(45) Date of Patent: *May 21, 2019

(54) SYSTEM AND METHODS FOR DECLARATION-BASED EXTENSION MANAGEMENT FOR MULTI-TENANT ENVIRONMENTS

(71) Applicant: NETSUITE INC., San Mateo, CA (US)

(72) Inventors: Alan S. Liu, Palo Alto, CA (US); Ryan Grisso, San Francisco, CA (US)

(73) Assignee: NETSUITE INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,669

(22) Filed: Jun. 1, 2015

(65) Prior Publication Data
US 2015/0261523 A1    Sep. 17, 2015

Related U.S. Application Data

(63) Continuation of application No. 13/865,430, filed on Apr. 18, 2013, now Pat. No. 9,075,687.

(60) Provisional application No. 61/635,427, filed on Apr. 19, 2012.

(51) Int. Cl.
| | | |
|---|---|---|
| *G06F 8/65* | (2018.01) | |
| *H04L 29/08* | (2006.01) | |
| *G06F 9/445* | (2018.01) | |

(52) U.S. Cl.
CPC ............... *G06F 8/65* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,105,089 A | * | 8/2000 | Chari | G06F 9/4411 710/18 |
| 6,779,717 B1 | * | 8/2004 | Somers, Jr. | G06Q 20/1085 235/379 |
| 8,255,490 B1 | | 8/2012 | Porter et al. | |

(Continued)

*Primary Examiner* — Li B. Zhen
*Assistant Examiner* — Mohammad H Kabir
(74) *Attorney, Agent, or Firm* — Kraguljac Law Group LLC

(57) ABSTRACT

A system and associated methods for enabling a tenant user of a multi-tenant computing platform to introduce an extension to the platform's functions and capabilities. A computing system, such as a distributed computing service platform, may manage independent customizations and/or extensions (collectively, "extensions") of the service platform by multiple tenants in a manner that avoids undesirable behavior that may be caused by incompatible extensions. The service may accomplish this by requiring that a proposed extension provided by a tenant or extension vendor be accompanied by a formal declaration with respect to service platform component functionality and/or service platform data objects (collectively, "service platform resources") that are utilized and/or modified by the extension. The service may further require that the extension be accompanied by validation code (e.g., one or more modules) that is capable of verifying that particular code modules or data objects of the extension are functioning as expected.

20 Claims, 8 Drawing Sheets

(56) References Cited

U.S. PATENT DOCUMENTS

| | | | |
|---|---|---|---|
| 8,683,462 B2* | 3/2014 | Goldman | G06F 9/445 |
| | | | 717/124 |
| 2006/0136923 A1* | 6/2006 | Kahn | G06F 9/468 |
| | | | 718/100 |
| 2006/0247606 A1* | 11/2006 | Batch | A61M 5/1413 |
| | | | 606/1 |
| 2006/0247944 A1 | 11/2006 | Calusinski et al. | |
| 2007/0157159 A1* | 7/2007 | Fildebrandt | G06F 8/10 |
| | | | 717/104 |
| 2007/0250531 A1 | 10/2007 | Wiggins et al. | |
| 2008/0154691 A1* | 6/2008 | Wellman | G05D 1/0282 |
| | | | 705/7.26 |
| 2008/0256558 A1* | 10/2008 | Buckner | G06F 9/4443 |
| | | | 719/323 |
| 2008/0256607 A1 | 10/2008 | Janedittakarn et al. | |
| 2010/0005443 A1 | 1/2010 | Kwok et al. | |
| 2010/0076583 A1* | 3/2010 | Wojack | G06Q 30/0214 |
| | | | 700/103 |
| 2011/0010394 A1 | 1/2011 | Carew et al. | |
| 2011/0231835 A1* | 9/2011 | Smith | G06F 8/61 |
| | | | 717/174 |
| 2011/0295814 A1* | 12/2011 | Kothari | G06F 17/30306 |
| | | | 707/687 |
| 2012/0030168 A1 | 2/2012 | Weissenberger et al. | |
| 2012/0151439 A1 | 6/2012 | Demant et al. | |
| 2012/0272192 A1* | 10/2012 | Grossman | G06F 3/0484 |
| | | | 715/854 |

* cited by examiner

SYSTEM AND METHODS FOR DECLARATION-BASED EXTENSION MANAGEMENT FOR MULTI-TENANT ENVIRONMENTS

CROSS-REFERENCE TO RELATED APPLICATIONS

This application claims priority from U.S. provisional patent application No. 61/635,427, filed Apr. 19, 2012 and is a continuation of U.S. non-provisional patent application Ser. No. 13/865,430, filed Apr. 18, 2013, both of which are incorporated herein by reference in their entirety for all purposes.

BACKGROUND

Performing computing and data processing functions using a distributed network of computers has become more common as enterprises have increased their reliance on a mobile workforce and have sought ways to reduce the high costs often associated with investments in information technology infrastructure. This has led to the development and deployment of a variety of services and business models, such as web-based services, Software-as-a-Service (SaaS), and cloud-computing based data storage and data processing. Such services and architectures can typically be configured to use varying amounts of computing resources, for example, based on service demand. Some such architectures are "multi-tenant", that is they provide computing, data processing, and data storage functions to multiple independent users or businesses.

In an effort to permit tenants to access the services and functionality that they desire (which may include providing certain services to their end customers, such as an eCommerce platform), a multi-tenant service platform may permit a tenant to configure certain aspects of the available service(s) to suit their business needs. For example, a business enterprise that uses the service platform may want to provide specific functions or capabilities to their customers. However, customizations introduced into the platform architecture by different tenants may be incompatible with each other in one or more ways, and this can cause a disruption in the services provided to other tenants. For example, such incompatibilities can cause undesirable and/or unintended behavior in the service configurations of multiple tenants, including tenants not associated with the customizations. Certain types of customizations may also impact the operation of the platform in general, such as by altering the manner in which data is accessed or processed.

Conventional approaches to managing potential problems arising from customizations and/or extensions to multi-tenant platform functionality are inefficient, ineffective and/or have undesirable side effects or other drawbacks with respect to at least one significant use case. For example, manually testing system behavior is impractical for anything but the most trivial of extensions. Further, most systems do not support any automatic verification of behavior. Those that do may allow automated verification of extension behavior, but they do not support a way of predicting possible conflicts using extensions declarations.

Embodiments of the invention are directed toward solving these and other problems individually and collectively.

SUMMARY

Embodiments of the invention are directed to a system and associated methods for enabling a tenant user of a multi-tenant computing platform to introduce an extension to the platform's functions and capabilities. In at least one embodiment, a computing system, such as a distributed computing service platform, may manage independent customizations and/or extensions (collectively, "extensions") of the service platform by multiple tenants in a manner that avoids undesirable behavior that may be caused by incompatible extensions. The service may accomplish this by requiring that a proposed extension provided by a tenant or extension vendor be accompanied by a formal declaration with respect to service platform component functionality and/or service platform data objects (collectively, "service platform resources") that are utilized and/or modified by the extension. The service may further require that the extension be accompanied by validation code (e.g., one or more modules) that is capable of verifying that particular code modules or data objects of the extension are functioning as expected. The service may then utilize the declarations and provided validation code in a variety of ways to avoid undesirable behavior caused by incompatible extensions.

In one embodiment, the invention is directed to a method of permitting users of a multi-tenant computing service platform to introduce an extension to one or more of the functions of the platform, wherein the method includes:

receiving a first extension package from a first user of the multi-tenant computing service platform, the first extension package defining a first extension and including a declaration that identifies one or more resources of the platform utilized by the first extension and a set of instructions executable by an electronic processor to validate operation of the first extension;

parsing the first extension package to identify the included declaration;

determining the one or more resources identified in the declaration;

operating the electronic processor to execute the set of instructions;

determining if execution of the set of instructions results in satisfying a threshold value with respect to a characteristic of the first extension; and installing the first extension if execution of the set of instructions satisfies the threshold value; and receiving a second extension package from a second user of the multi-tenant computing service platform, the second extension package defining a second extension and including a declaration that identifies one or more resources of the platform utilized by the second extension and a set of instructions executable by an electronic processor to validate operation of the second extension;

parsing the second extension package to identify the included declaration;

determining the one or more resources identified in the declaration;

operating the electronic processor to execute the set of instructions;

determining if execution of the set of instructions results in satisfying a threshold value with respect to a characteristic of the second extension; and installing the second extension if execution of the set of instructions satisfies the threshold value.

In another embodiment, the invention is directed to a method of permitting a user of a multi-tenant computing service platform to introduce an extension to one or more of the functions of the platform, wherein the method includes:

receiving an extension package from the user of the multi-tenant computing service platform, the extension package including a declaration that identifies one or more resources of the platform utilized by the extension and a set of instructions executable by an electronic processor to validate operation of the extension;

parsing the extension package to identify the included declaration;

determining the one or more resources identified in the declaration;

operating the electronic processor to execute the set of instructions;

determining if execution of the set of instructions results in satisfying a threshold value with respect to a characteristic of the extension;

installing the extension if execution of the set of instructions satisfies the threshold value;

receiving a request to access the extension;

determining if the request conforms to the terms of the extension; and processing the request if the request conforms to the terms of the extension.

In yet another embodiment, the invention is directed to a system for permitting users of a multi-tenant computing service platform to introduce an extension to one or more of the functions of the platform, wherein the system includes:

a user interface layer;
an application layer;
a data storage layer; and
an extension manager, the extension manager further comprising
  an install validation component configured to determine, at least in part, whether code associated with a proposed extension satisfies a validation criterion prior to installation of the code;
  a runtime validation component configured to determine, at least in part, whether execution of the code associated with the proposed extension would result in access of resources associated with one or more other previously installed extensions;
  a declaration enforcement component configured to determine, at least in part, whether execution of the code associated with the proposed extension results in access of the resource or resources identified in a declaration associated with the proposed extension;
  a declaration database containing data related to declarations associated with one or more previously installed extensions; and
  a validation code database containing validation code associated with one or more previously installed extensions.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

Figure 1:
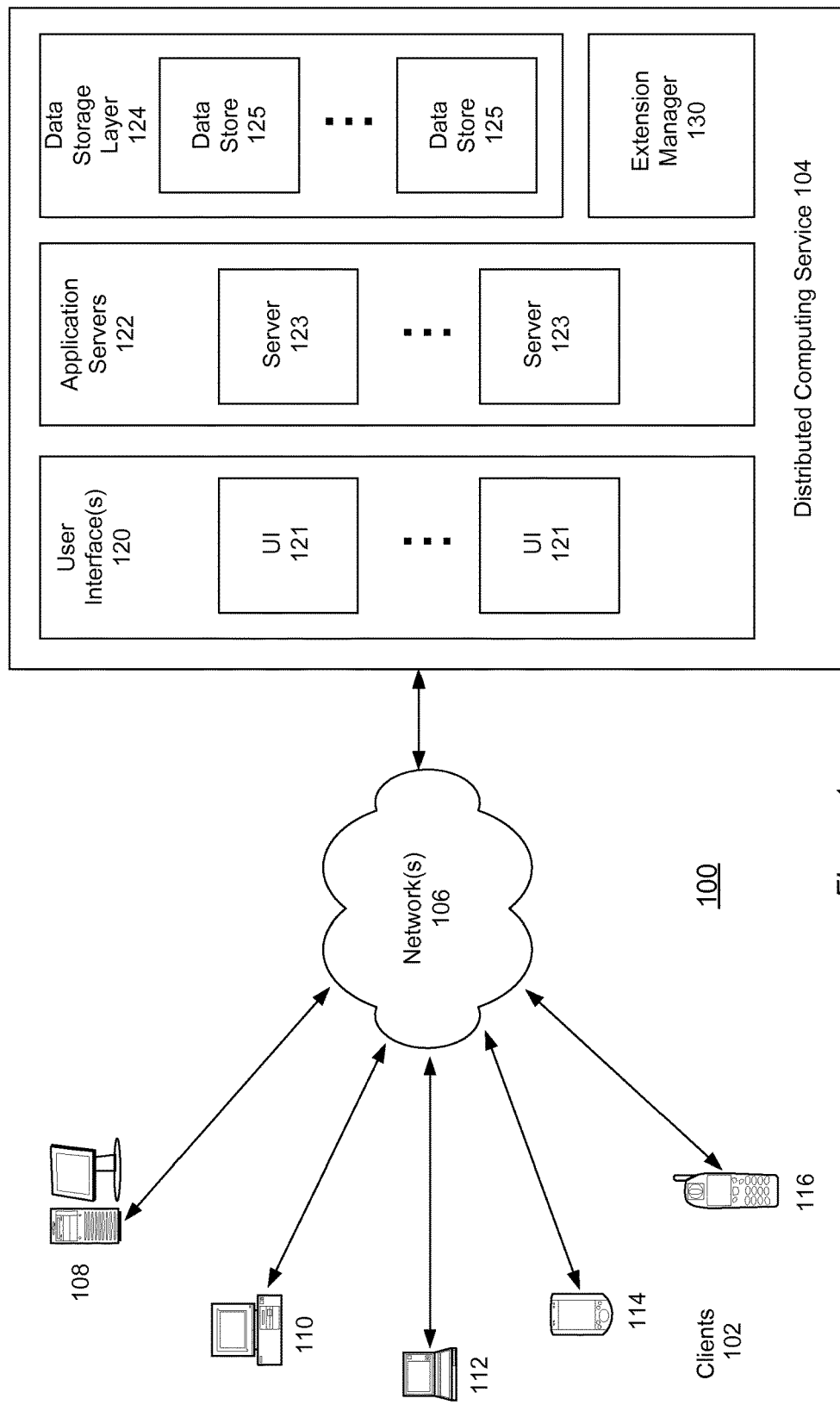
FIG. 1 is a schematic diagram depicting aspects of an example computing environment in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, a computing system, such as a distributed computing service platform, may manage independent customizations and/or extensions (collectively, "extensions") of the service platform by multiple tenants in a manner that avoids undesirable behavior that may be caused by incompatible extensions. The service may accomplish this by requiring that a proposed extension provided by a tenant or extension vendor be accompanied by a formal declaration with respect to service platform component functionality and/or service platform data objects (collectively, "service platform resources") that are utilized and/or modified by the extension. The service may further require that the extension be accompanied by validation code (e.g., one or more modules) that is capable of verifying that particular code modules or data objects of the extension are functioning as expected. The service may utilize the declarations and provided validation code in a variety of ways to avoid undesirable behavior caused by incompatible extensions.

For example, the service may monitor (at runtime or during a pre-deployment test phase) the service platform resources that are utilized and/or modified by the extension, and compare the monitored activity to the activity expected based on the submitted declaration(s). If the service detects a conflict or inconsistency between the monitored activity and the expected (declared) activity, then the service may signal a fault to one or more of the system administrator, the submitter of the extension, or to a user of the extension. For example, utilization of the extension may include sending one or more requests to a user interface, such as an application programming interface (API), and the service may deny such requests when a conflict is detected between the monitored activity and the expected (declared) activity.

In some embodiments, the service may determine a set of service platform resources (e.g., data, executable code, APIs) associated with a particular formal declaration, and may further determine when the resources associated with different declarations overlap or exhibit another indicator of possible incompatibility. If the service detects that the functionality of an extension that is associated with an overlap of resources is being accessed, then the service may require that the access attempt is first validated by application of the associated validation code modules. In some embodiments, such a validation process may be required at runtime (e.g., at the time of the access attempt). For example, suppose the service detects that extensions A and B utilize, modify and/or extend (collectively, "extend") an overlapping set of service platform resources, based at least in part on their associated formal declarations. The service may detect an access attempt, via extension A or B, of the overlapping portion of the service platform resources and in response require that the access attempt be validated by the validation code associated with extension A and/or B. In accordance with at least one embodiment of the invention, the service platform may also provide validation code modules associated with various service platform resources, and manipulation audits (e.g., code overlap checks and code validation) may be performed with respect to the service platform.

Prior to installing and/or activating a service platform extension, the service may require that the validation code associated with the extension satisfy one or more validation quality criteria. For example, the service may measure a code coverage ratio (i.e., the proportion of code in the extension that was executed during the execution of the validation tests—if every line of code from the extension is touched during execution of validation tests, code coverage would be 100%) with respect to the extended service platform resource(s), and require that the code coverage ratio be greater than a threshold value (e.g., 85%, 95%). The service may measure the code coverage ratio of a set of validation code modules at least in part by executing the validation code in the set and observing the portions of the extension code and/or the service platform resources that are accessed/utilized by the validation code.

In addition to measuring code coverage by measuring executable lines touched, the system may also measure the ratio of extension defined resources touched during validation. For instance, if an extension was added to a business system to calculate shipping costs for an order, the extension might define a shipping method as a custom record and a table of shipping rate by weight as an attribute of the record. If the system determined that validation tests created the shipping method record and wrote to and read from the rate table, then the object would be considered "covered" by the tests. Note that different thresholds may exist for objects as opposed to code, in terms of what is considered adequate coverage. Further, coverage could also be measured based on extension declarations. For instance, if an extension declares "Read TaxableTotal field from Invoice", then the declaration would be considered "covered" if the validation tests read the value of the TaxableTotal field from an invoice record. Thus, in some cases, a coverage ratio with respect to service platform resources may be determined relative to the set of service platform resources, and this value used as part of a process to determine if a proposed extension will be accepted.

In at least one embodiment, the validation code may be used to ensure that different extensions do not cause problems with the platform/system behavior when used together, i.e., that the proposed extensions are not incompatible. The validation code can be used to determine this because when an extension is installed on top of other extensions, the validation code for the extension being added and for any other potentially conflicting extensions in the system can be executed. A potential conflict may be determined by extension declaration collisions between extensions, where validation failures indicate that the behavior of one or more extensions was interrupted or broken. In one embodiment, validation code may take the form of executable code that calls APIs to interact with the system and verify behavior. In a business application, an example might be: "Execute an invoice with an item for $5.00 with a 1% sales tax. Verify tax is $0.05."

FIG. 1 depicts aspects of an example computing environment 100 in which an embodiment of the invention may be implemented. As shown, a variety of clients 102 incorporating and/or incorporated into a variety of computing devices may communicate with a distributed computing service 104 through one or more networks 106. For example, a client may incorporate and/or be incorporated into a client application (e.g., software) implemented at least in part by one or more of the computing devices. Examples of suitable computing devices include personal computers, server computers 108, desktop computers 110, laptop computers 112, notebook computers, personal digital assistants (PDAs) 114, smart phones 116, cell phones, and consumer electronic devices incorporating one or more computing device components such as one or more processors, central processing units (CPU), or controllers. Examples of suitable networks 106 include networks utilizing wired and wireless communication technologies and networks operating in accordance with any suitable networking and/or communication protocol (e.g., the Internet).

The distributed computing service 104 may include multiple processing tiers including a user interface tier 120, an application tier 122, and a data storage tier 124. The user interface tier 120 may maintain multiple user interfaces 121, including graphical user interfaces and/or web-based interfaces. The user interfaces may include a default user interface for the service, as well as one or more user interfaces extended by one or more tenants of the service (e.g., via access to one or more APIs). The default user interface may include components enabling tenants to provide service platform extensions and otherwise administer their participation in the functions and capabilities provided by the service. Tenants may be distinguished from other users in this way, and/or tenants may be responsible for costs incurred due to utilization of the distributed computing service by tenant customers (e.g., users of the service as extended by the tenant). Each tier may be implemented with a set of computers and/or computer components including computer servers and processors, and may perform various functions, methods, processes, or operations as determined by the execution of a software application or set of instructions. The data storage tier 124 may include one or more production data stores 125 and one or more testing, validation and/or backup data stores 125. Data stores may be implemented with any suitable data storage technology including structured query language (SQL) based relational database management systems (RDBMS).

In accordance with at least one embodiment of the invention, distributed computing service 104 may be multi-tenant, and one or more tenants may be able to propose extensions to the services and functions performed by service 104. However, as noted the ability for tenants to extend a common service platform may result in inter-tenant extension incompatibilities if the proposed extensions are not effectively managed. To address this potential problem, the distributed computing service 104 may further include an extension manager component 130 configured to provide management functions and compatibility resolution capabilities for proposed service platform extensions. In one embodiment, tenants may interact with the extension manager 130 through one or more of the user interfaces 121. An example extension manager 130 in accordance with at least one embodiment of the invention is described in more detail herein, with reference to FIG. 4. However, before providing such details, further information is provided with respect to distributed computing services and service platform extensions in accordance with at least one embodiment of the invention.

As noted, service platform 104 may be operated by an entity in order to provide multiple tenants with a set of business related applications and functionality. These applications and functionality may include ones that a business uses to manage various aspects of its operations. For example, the applications and functionality may include providing web-based access to business information systems, thereby allowing a user with a browser and an Internet or intranet connection to view, enter, or modify certain types of business information.

Such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of a service platform is an integrated Customer Relationship Management (CRM) system, which is designed to assist in obtaining a better understanding of customers, enhance service to existing customers, and assist in acquiring new, profitable customers. By way of example, the capabilities or modules of a CRM system may include: sales force automation (SFA), marketing automation, contact list management, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

Both functional advantages and strategic advantages may be gained through the use of an integrated business system comprising ERP, CRM, and other business capabilities, as for example where the integrated business system is integrated with a merchant's eCommerce platform and/or "web store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can, not only process the order, update accounts receivable, inventory databases, and other ERP-based systems, but can also automatically update strategic customer information databases, and other CRM-based systems. These modules and other applications and functionalities may advantageously be integrated and executed by a single code base accessing one or more integrated databases as necessary, forming an integrated business management platform.

However, each merchant is unique in terms of their commercial offerings, desired customer demographics, and marketing techniques, but also in terms of their internal business organization and philosophies. Therefore, a robust integrated business services platform preferably offers not only a rich set of features, but also is capable of being customizable for each business' needs. Thus, it is desirable to provide users of such a system with the ability to develop custom software applications and features that leverage the advantages of the functionality of an integrated business platform in the manner most desired by a particular user.

Figure 2:
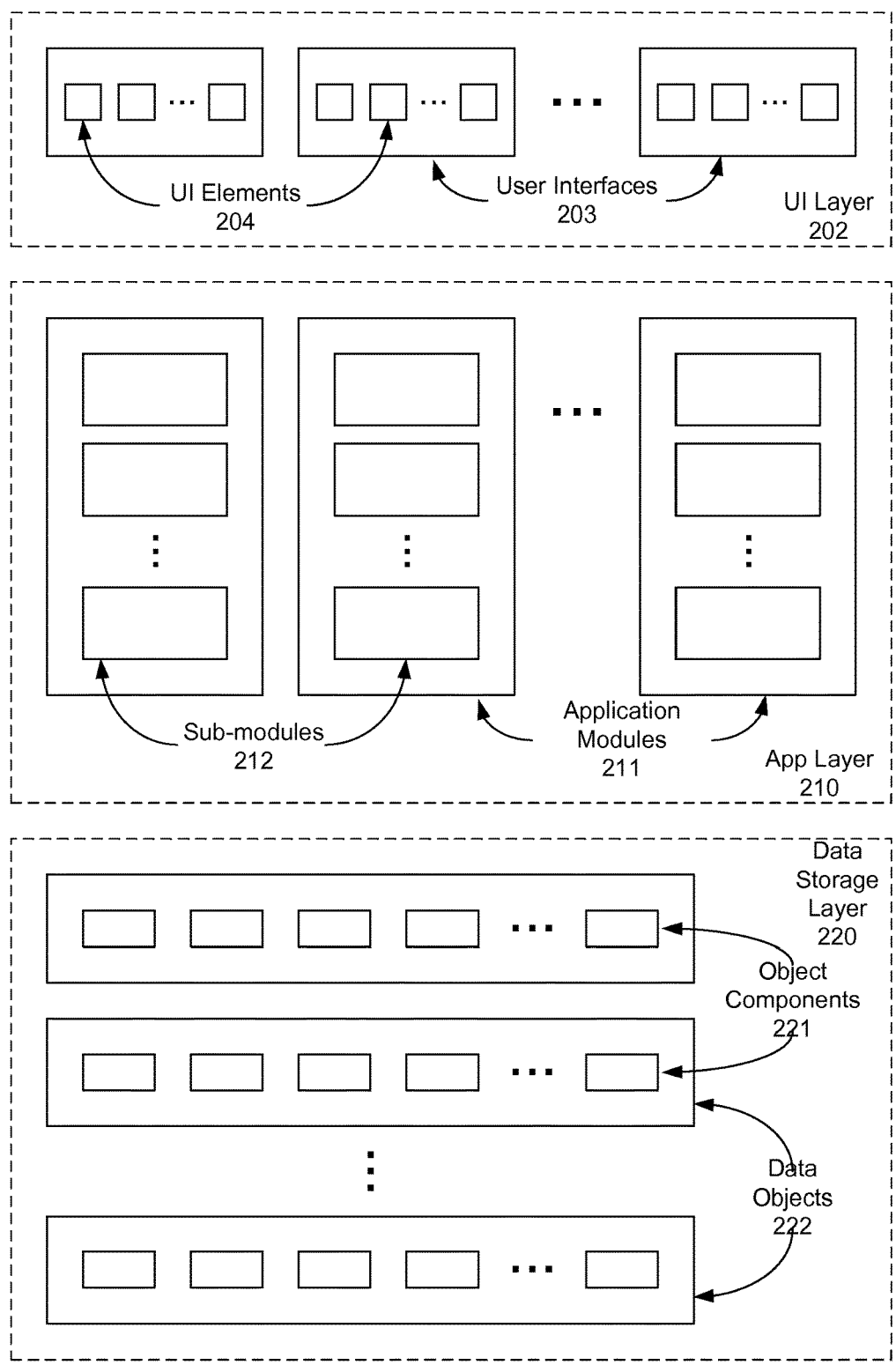
FIG. 2 depicts aspects of an example of a distributed computing service architecture in accordance with at least one embodiment of the invention.

FIG. 2 depicts aspects of an example of a distributed computing service architecture 200 in accordance with at least one embodiment of the invention. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. In one embodiment, proposed service platform extensions may extend the user interface layer by adding a new user interface, removing or replacing an existing user interface, and/or extending an existing user interface. An existing user interface may be extended by adding new interface elements, replacing interface elements, and/or altering/extending user interface elements (such as by altering the previous functionality, display, or purpose of such elements).

The application layer 210 may include one or more application modules 211, each having one or more sub-modules 212. The application modules and/or sub-modules may include any suitable computer-executable code or set of instructions (e.g., as would be executed by a suitably programmed processor or CPU), such as computer-executable code corresponding to a programming language. For example, programming language source code may be compiled into computer-executable code. Alternatively, or in addition, the programming language may be an interpreted programming language such as a scripting language. Each application server (element 123 of FIG. 1) may include each application module. Alternatively, different application servers may include different sets of application modules. Such sets may be disjoint or overlapping. In one embodiment, proposed service platform extensions may extend the application layer by adding new application modules, removing or replacing existing application modules, and/or extending the functionality of existing application modules. An existing application module may be extended by adding new sub-modules, removing or replacing existing sub-modules and/or altering/extending the functionality of existing sub-modules.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping. In one embodiment, proposed service platform extensions may extend the data storage layer by adding new data objects, removing or replacing existing data objects, and/or extending existing data objects. Existing data objects may be extended by adding new data object components, removing or replacing existing data object components, and/or altering/extending existing data object components.

Note that the example computing environment depicted in FIG. 1 is not intended to be a limiting example. Alternatively, or in addition, computing environments in accordance with at least one embodiment of the invention may include any suitable system that permits installation of a module that modifies default behavior (e.g., an extension). Examples of suitable systems include modifiable hardware systems, computing systems incorporating firmware or re-configurable processors, and stand-alone or local-only software systems or applications. Although further examples below may reference the example computing environment depicted in FIG. 1, it will be apparent to one of skill in the art that the examples may be adapted for alternate computing devices, systems, and environments.

Figure 3:
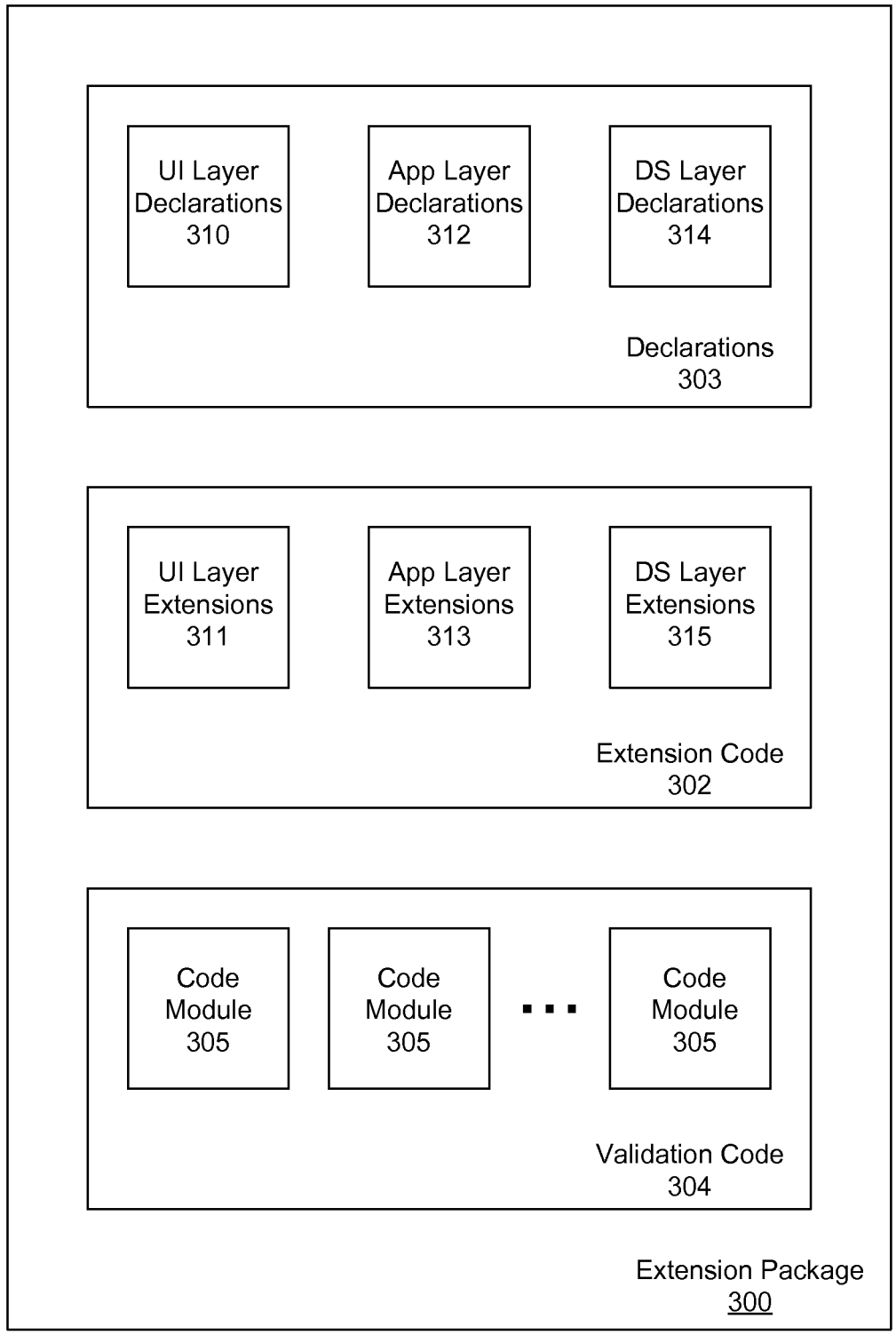
FIG. 3 depicts aspects of an example extension package in accordance with at least one embodiment of the invention.

The distributed computing service 104 of FIG. 1 may require that tenants provide proposed extensions in an extension package having a specified format and/or a specified set of associated data. FIG. 3 depicts aspects of an example extension package 300 in accordance with at least one embodiment of the invention. The example extension package includes extension code 302, associated formal declarations 303 with respect to service platform resources that are utilized by the extension code ("declarations"), and associated validation code 304 that can verify that the extension code has intended results when executed. The extension code may include extensions for any suitable portion of the distributed computing system including extensions for the user interface layer, the application layer, and/or the data storage layer.

The declarations 303 may specify the service platform resources utilized by the extension code at any suitable level of granularity. For example, declarations 310 with respect to user interface extensions 311 may specify one or more sets of user interfaces and/or one or more sets of interface elements that are utilized by the user interface layer extensions. Declarations 312 with respect to application layer extensions 313 may specify one or more sets of application modules and/or sub-modules that are utilized by the application layer extensions. Declarations 314 with respect to data storage layer extensions 315 may specify one or more sets of data objects and/or data object components that are utilized by the data storage layer extensions. Alternatively, or in addition, declarations may be made with respect to extension code and without reference to a particular layer or tier of the distributed computing system. Declarations may reference any suitable combination of user interfaces, user interface elements, application modules, application sub-modules, data objects, and/or data object components that are utilized by the extension code.

The validation code 304 may include one or more validation code modules 305. For example, each validation code module 305 may correspond to one or more portions of extension code 302. The correspondence between validation code and extension code may occur at any suitable level of granularity. For example, a validation code module may correspond to one or more user interfaces, user interface elements, application modules, application sub-modules, data objects, and/or data object components. In one embodiment, the declarations may specify a mapping between validation code and extension code modules, sub-modules, etc.

In accordance with at least one embodiment of the invention, the layers, interfaces, modules, objects, elements, sub-modules and/or components (collectively, "code") depicted in FIG. 3 may be associated with extension groups or environments. For example, extension groups may include a base group, a mutable group, and a tenant-controlled group. The base code group may correspond to a stable base or core platform that is not able to be altered by extensions. The mutable code group may correspond to platform code that may be changed by extensions. The tenant-controlled group may correspond to code that may not be affected by extensions without explicit authorization by the affected tenants. For example, the user interface layer may include one or more user interfaces configured and/or customized for each tenant that are unaffected by extensions unless the affected tenant explicitly incorporates extended code into their user interface(s).

Figure 4:
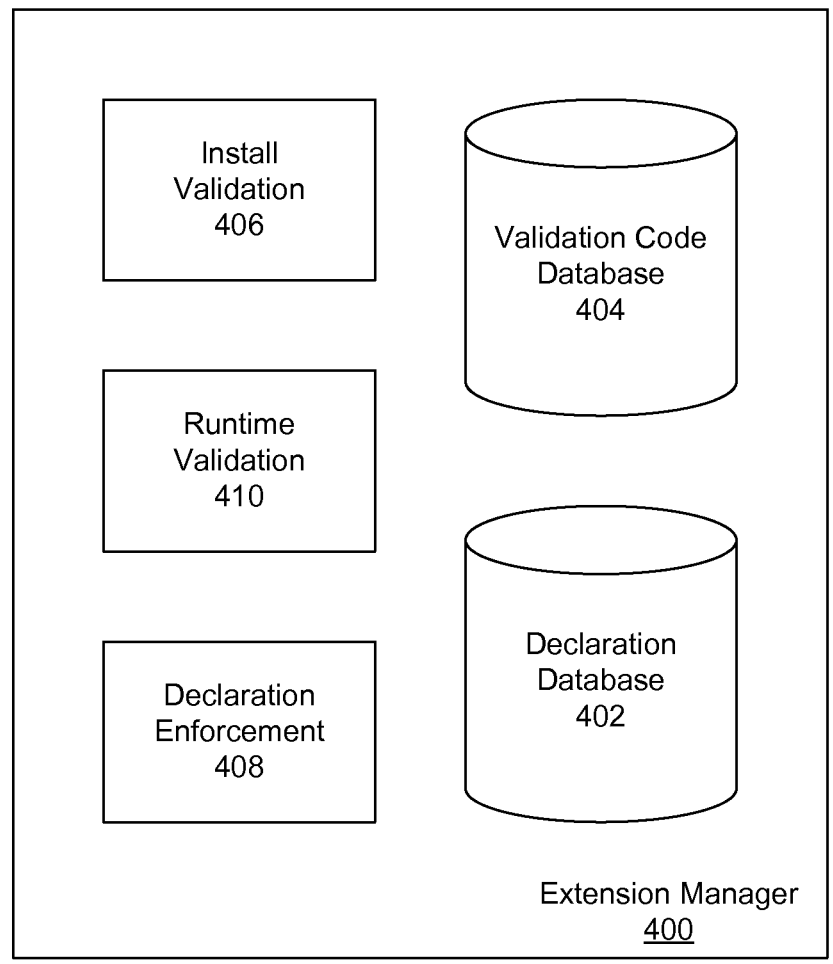
FIG. 4 depicts aspects of an example extension manager in accordance with at least one embodiment of the invention (such as represented by element 130 in FIG. 1)

FIG. 4 depicts aspects of an example extension manager 400 in accordance with at least one embodiment of the invention (such as represented by element 130 in FIG. 1). The extension manager 400 may receive and parse proposed extension packages. Declarations and/or corresponding data structures may be stored in a declaration database 402. Validation code and/or validation code-extension code associations may be stored in a validation code database 404. The extension manager 400 may validate and install extension code. An install validation component 406 of the extension manager 400 may determine whether received extension code satisfies one or more validation quality criteria prior to installation.

A declaration enforcement component 408 of the extension manager 400 may monitor service platform resources that are utilized and/or modified by installed extension code and may compare the monitored activity to the activity that is expected based on a set of associated declarations. Upon detection of a fault or conflict, the declaration enforcement component 408 may deny an associated request. Where monitored activity involves activity or transactions affecting data in a live or production data store, such activity or transactions may be rolled back. Alternatively, or in addition, monitored activity may occur in a virtual data space and committed to the live or production data store when the declaration enforcement component 408 determines that the monitored activity has completed without a fault or conflict being detected.

A runtime validation component 410 of the extension manager 400 may determine declarations that are associated with an overlap between their respective service platform resources (i.e., declarations that reference the same resource or set of resources) and, when the corresponding extension code is accessed by distributed computing system users, may require that the access call or request be validated by the associated validation code before being allowed. Alternatively, or in addition, an overlap may be determined based at least in part on the observed service platform resource access that occurs during validation code execution as part of the extension code installation process, for example, based at least in part on code coverage data collected by the install validation component 406.

Figure 5:
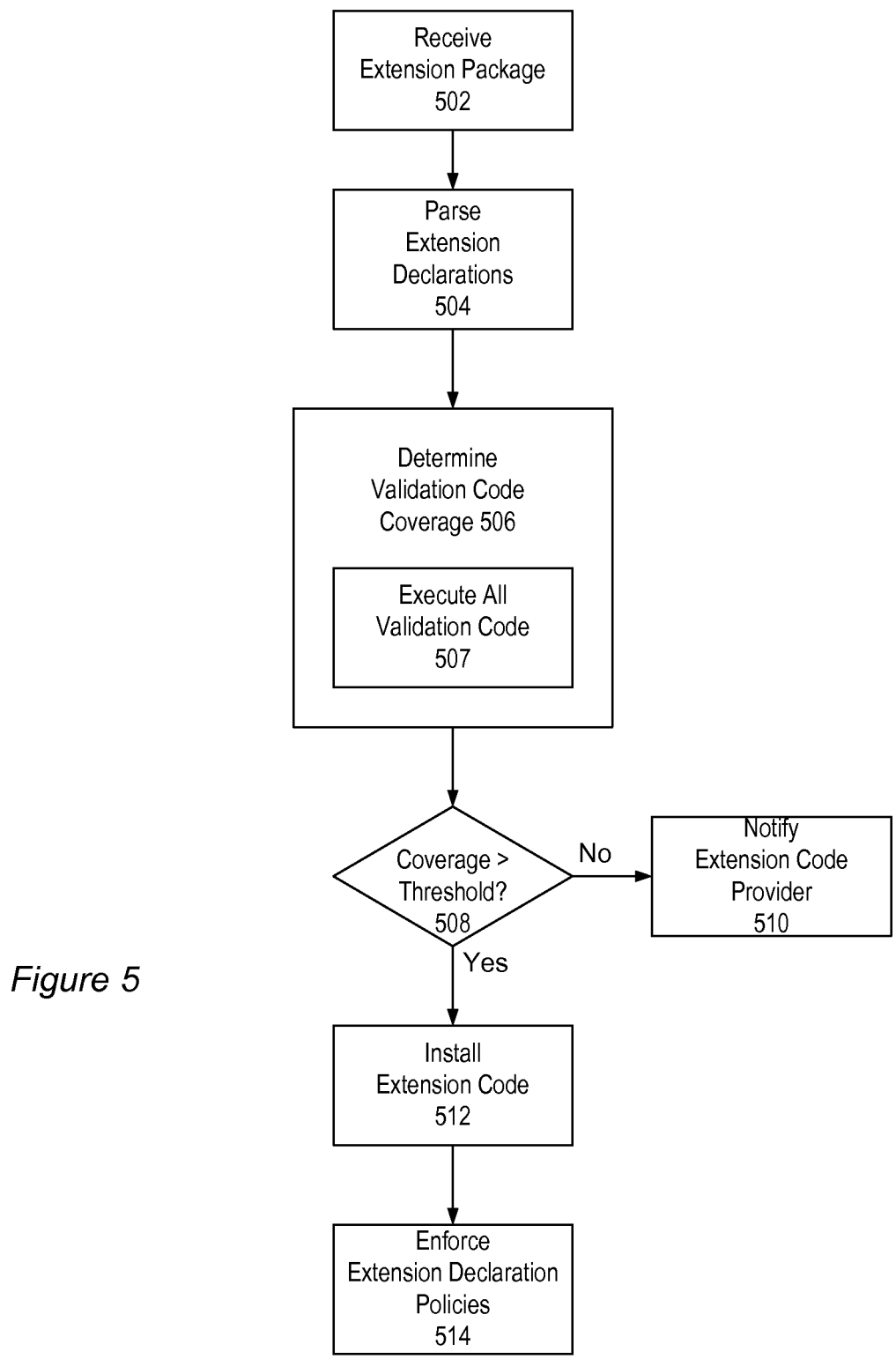
FIG. 5 is a flow chart or flow diagram illustrating the steps or stages of an exemplary process that may be performed as part of extension management, in accordance with at least one embodiment of the invention.

The description now turns to procedures that may be performed as part of the installation and use of an extension, in accordance with at least one embodiment of the invention. For example, the procedures may be performed by an implementation of the extension manager. FIG. 5 is a flow chart or flow diagram illustrating the steps or stages of an exemplary process 500 that may be performed as part of extension management, in accordance with at least one embodiment of the invention. FIG. 5 describes a process whereby new extensions are validated (using their own validation code) as they are added to the platform/system. This ensures that no incompatibility exists between the proposed extension and other extensions. The proposed extension can also be rated on how well it was validated by measuring the proportion of extension code that was executed during the validation (i.e. code coverage). Code coverage minimums can be enforced on the system to ensure uniformly robust extensions.

As shown in the figure, the process includes an extension package being received (stage 502). For example, the extension manager may receive the extension package from an authorized administrator for a tenant of the distributed computing service. The extension package may be parsed, and such parsing may include parsing of the declarations in the extension package (stage 504). For example, the extension manager may parse the extension package and store the declarations or corresponding data structures in the declaration database.

A level of code coverage of the validation code in the received declaration package may then be determined (stage 506). For example, the install validation component of the extension manager may execute the validation code (or cause it to be executed), as suggested by stage 507, and may monitor the service platform resources that are accessed as a result of that execution. If the level of code coverage is not greater than a code coverage threshold (as illustrated by the "No" branch of decision process 508), then the provider of the extension package may be notified of the shortcoming (stage 510), and the extension manager may decline to install the extension code. Otherwise (as illustrated by the "Yes" branch of decision process 508), the extension manager may install the execution code into the production environment (or cause it to be installed), as suggested by stage 512. For example, the extension manager may cause the extension code to be installed in (or on) a suitable live user interface, application, and/or data store server. The declaration enforcement component may then ensure that calls and/or requests accessing the installed extensions conform to the provided declarations (stage 514), as will be described in greater detail with reference to FIG. 6 and FIG. 7.

Figure 6:
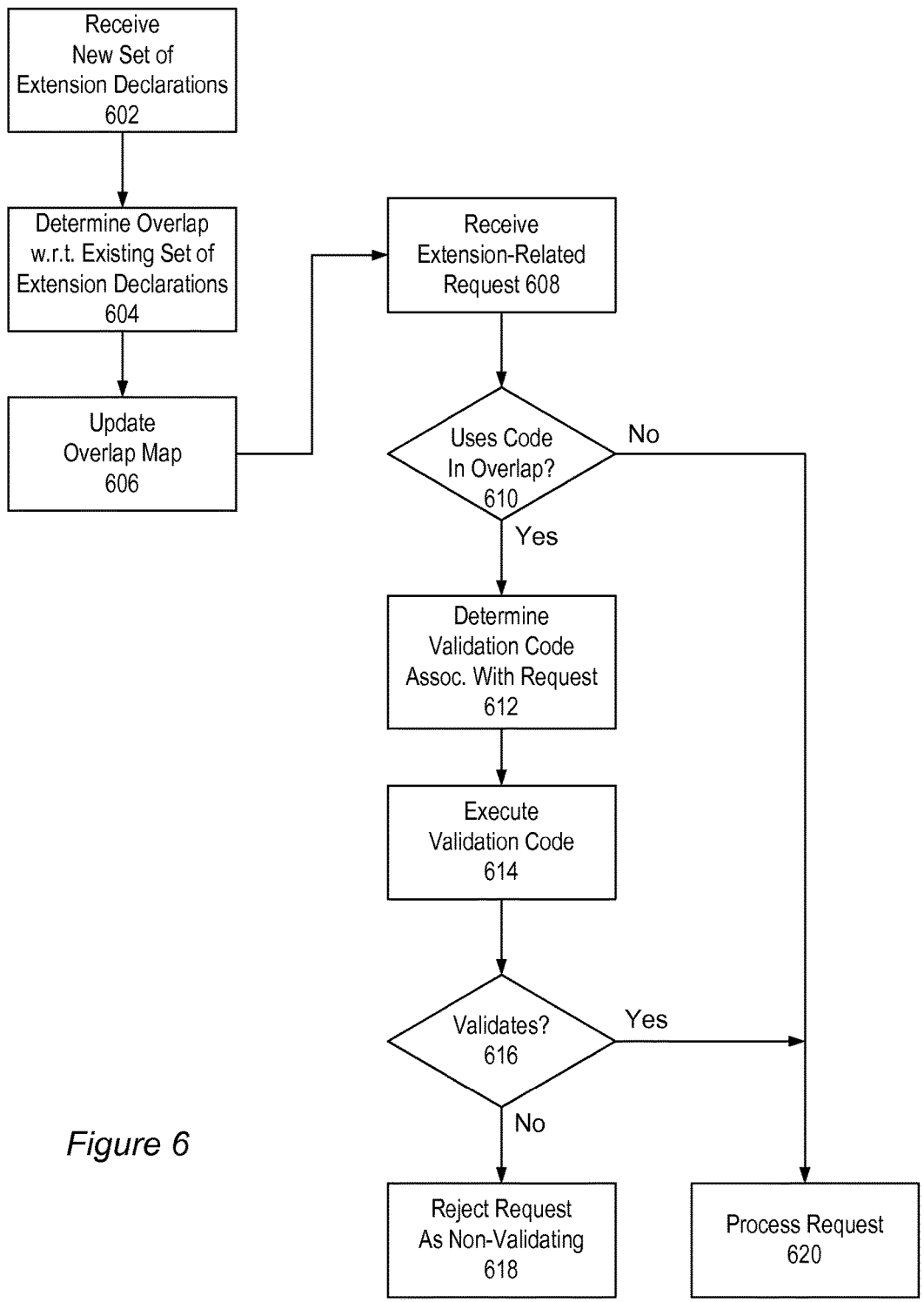
FIG. 6 is a flow chart or flow diagram illustrating the steps or stages of an exemplary process that may be performed as part of extension-related request handling, in accordance with at least one embodiment of the invention.

FIG. 6 is a flow chart or flow diagram illustrating the steps or stages of an exemplary process 600 that may be performed as part of extension-related request handling, in accordance with at least one embodiment of the invention. FIG. 6 describes how overlapping extension declarations may be used to determine whether or not to execute validation code on other extensions as new extensions are added to the system.

When a new set of extension declarations is received (stage 602), for example as part of a declaration package, one or more overlaps with respect to existing declarations may be determined (stage 604). For example, the runtime validation component of the extension manager may determine the overlap(s) at the time the declarations are received and update an overlap map maintained in the declaration database (stage 606). Upon receiving an extension-related request (stage 608), such overlap maps may be utilized (for example, by the runtime validation component), to determine whether a particular request will access service platform resources that are associated with an overlap (stage 610). If not (as illustrated by the "No" branch of decision process 610), then the request may be processed as normal (stage 620). If so (as illustrated by the "Yes" branch of decision process 610), then validation code associated with the request may be determined, for example, based at least in part on extension code-validation code associations specified by the declarations (stage 612).

The runtime validation component of the extension manager may then execute the validation code associated with the request (stage 614), and if the request is validated by the validation code (as illustrated by the "Yes" branch of decision process 616), then the request may be processed as normal (stage 620). Otherwise (as illustrated by the "No" branch of decision process 616), the request may be denied as non-validating (stage 618). For example, the runtime validation component may respond to the initiator of the request with an indication that the validation process failed. In accordance with at least one embodiment of the invention, the runtime validation component has at least one mode of operation in which the validation code associated with the request is executed regardless of whether an overlap is detected.

Figure 7:
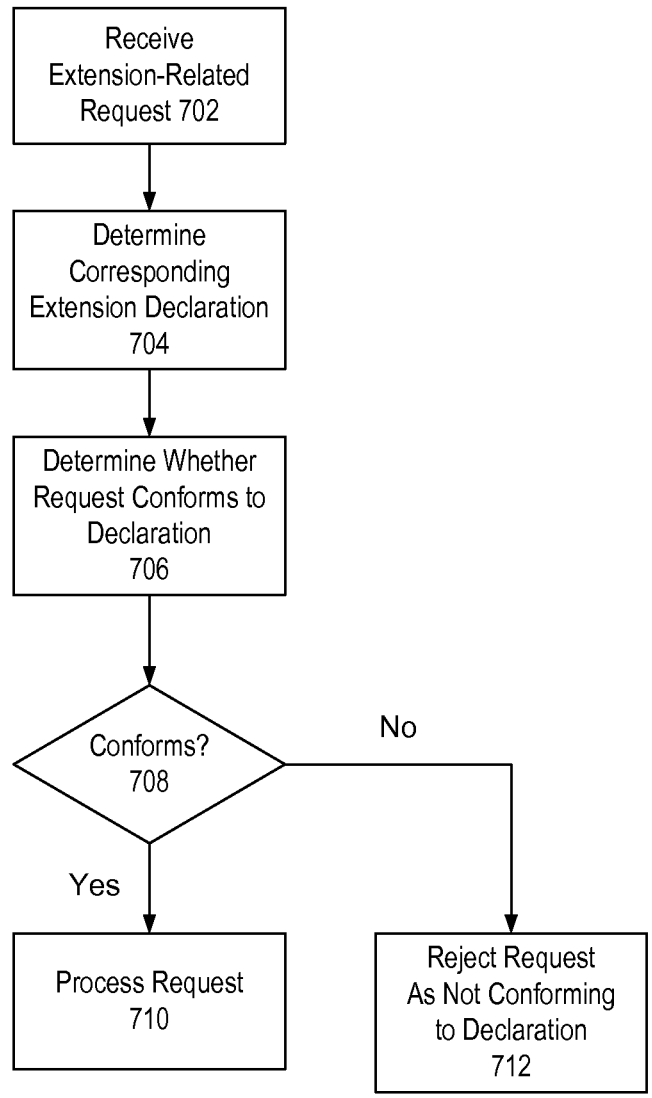
FIG. 7 is a flow chart or flow diagram illustrating further example steps for extension-related request handling, in accordance with at least one embodiment of the invention.

FIG. 7 is a flow chart or flow diagram illustrating further example steps for extension-related request handling, in accordance with at least one embodiment of the invention. FIG. 7 describes a way that declarations may be restricted to using only the parts of the system that have been declared. For instance, a declaration could reference a business object and a permission to perform an action on the object: "Modify TaxTotal field on invoice" or "Read customer address from sales order." During execution of extension code, if the system detects an action that has not been declared, execution may be halted, or otherwise limited or constrained.

Upon receiving an extension-related request (stage 702), a corresponding extension declaration may be determined (stage 704). For example, particular declarations may specify one or more portions of the extension code with which they are associated, and a reverse mapping from the extension code to the declarations may be constructed and/or updated when the declarations are received and parsed. The declaration enforcement component may identify an incoming request as being extension-related and utilize the reverse mapping to determine one or more associated declarations.

The associated declaration(s) may reference a set of service platform resources, of which the request is expected to utilize at least a portion. It may then be determined whether or not the request conforms to the associated declarations (stages 706 and 708). For example, it may be determined whether or not, in performing the request, the extension utilizes, or is predicted to utilize, service platform resources outside of the set referenced by the associated declaration(s). If so (as illustrated by the "No" branch of decision process 708), then the declaration enforcement component may reject the request as failing to conform to the declaration(s) (stage 712). Otherwise (as illustrated by the "Yes" branch of decision process 708), the request may be processed as normal (stage 710).

With regards to FIGS. 5, 6, and 7, note that each figure describes a method of ensuring proper functioning of multiple extensions within a single extensible system. In doing this, each illustrated method addresses the potential problem(s) that may arise from incompatible extensions at a different stage in the extension cycle; when an extension is added to the system (the method described with reference to FIGS. 5 and 6), and when an extension is executed (the method described with reference to FIG. 7).

With regards to how potential conflicts between extensions or other forms of incompatibilities are determined by reference to declarations, note that declarations inform the platform/system as to which types of standard behavior or functionality the extension proposes to modify. As examples, such standard behaviors or functionality may include: (1) reading and writing of standard records and fields, (2) reading and writing of records and fields from other extensions, or (3) execution of processes (e.g. tax pipeline, lead routing, PO approval routing, etc.). Declarations may include information relevant to virtually any process or data that is part of the platform/system and that is accessible via a UI or a programmatic API (e.g., including processes such as login, caching, external system communication, payment processing, etc.). Declarations may also be thought of as access requests. If an extension desires access to specific data or a process, it must be requested declaratively (e.g. "Modify TaxTotal field on Invoice"). In order to make modifications to data or processes, the intent to do so must be declared or the extension will fail when it tries to read or modify the data or process.

Dependencies between extensions may be determined by looking at whether there are dependencies between the declarations. For instance, if one extension reads a particular field and another extension writes to the same field, then the reading extension has a dependency on the writing extension. Two extensions that write to the same field have a dependency on each other. Two extensions that use the same process have a dependency on each other. Validation tests can be executed whenever there is a dependency to determine if there is a conflict between one or more extensions.

Note that although the previous description of one or more embodiments of the invention has been directed to implementation of the invention within a multi-tenant distributed computing platform or service that provides one or more of ERP, CRM, or eCommerce functions, embodiments of the invention may also be utilized with other types of customizable systems. Typically, platforms that are customizable will include the following components: (1) standard records and behavior, (2) custom attributes on standard records, (3) custom records, and (4) some degree of customizable behavior via a programming language with access to some or all system records and processes. Given one or more of those components, the invention describes ways of using the components to determine whether a proposed extension will function properly and to identify possible incompatibilities between a proposed extension and existing platform functionality. For example, in one platform the standard records may be business objects (e.g. Invoice, Vendor, Item, etc.). In another platform, the standard records may be CRM records (e.g. Customer or Opportunity). In yet another platform (such as an email platform), the standard records may be emails, contacts, or calendar events.

In accordance with at least one embodiment of the invention, the system, apparatus, methods, processes and/or operations for extension management may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system.

Figure 8:
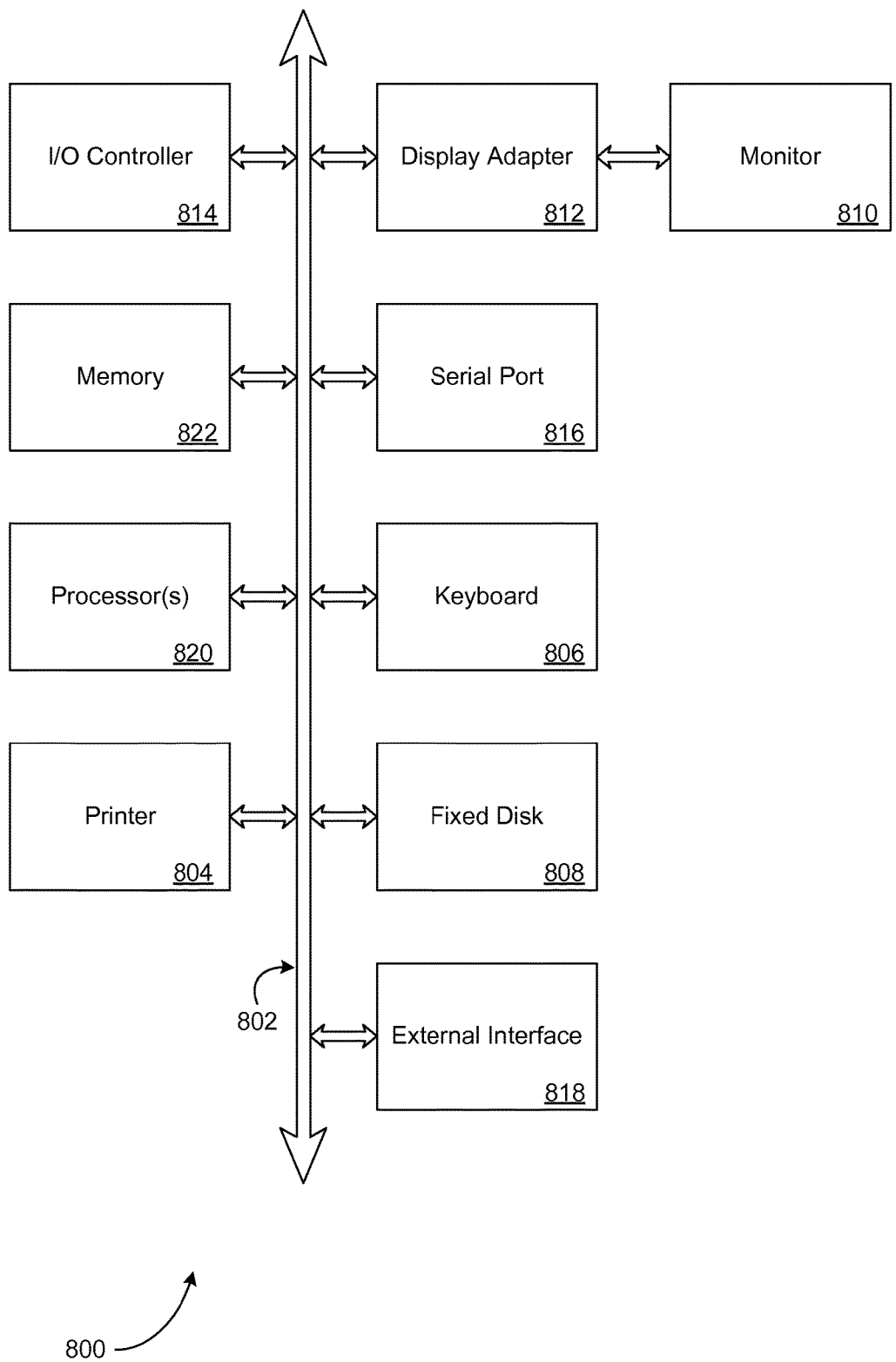
FIG. 8 depicts aspects of elements that may be present in a computer device and/or system configured to implement a method and/or process in accordance with some embodiments of the present invention.

As an example, FIG. 8 depicts aspects of elements that may be present in a computer device and/or system 800 configured to implement a method and/or process in accordance with some embodiments of the present invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for improving the performance of a computing system, the method comprising:
receiving an extension package at a multi-tenant computing service platform and receiving a request to install the extension package as part of the multi-tenant computing service platform;
parsing the request and the extension package to identify whether a declaration is included, wherein the declaration identifies one or more resources of the multi-tenant computing service platform to be utilized by the extension package;
if the declaration is not identified by the parsing, then rejecting the request to install the extension package to avoid installing an incompatible extension;
if the declaration is identified by the parsing, then proceeding with the installation comprising:
identifying validation instructions included with the extension package, wherein the validation instructions are executable by an electronic processor to validate operation of the extension package with regard to service platform resources on the multi-tenant computing service platform;
determining the one or more resources identified in the declaration;
operating the electronic processor to execute the validation instructions to validate operation of the extension package with regard to service platform resources on the multi-tenant computing service platform;
determining if execution of the validation instructions results in a condition with respect to a characteristic of the extension package; and
installing the extension package as part of the multi-tenant computing service platform if execution of the validation instructions results in the condition.

2. The method of claim 1, wherein determining if execution of the set of instructions results in a condition with respect to a characteristic of the extension package further comprises determining if execution of the set of instructions results in meeting or exceeding a threshold ratio of coverage of the code that would be executed by a use of the extension package.

3. The method of claim 1, wherein determining if execution of the set of instructions results in a condition with respect to a characteristic of the extension package further comprises determining if execution of the set of instructions results in meeting or remaining less than a threshold value with respect to coverage of resources defined by the extension package.

4. The method of claim 1, further comprising:
receiving a request to access the extension package;
determining if the request conforms to the terms of the extension package; and
processing the request if the request conforms to the terms of the extension package.

5. The method of claim 1, wherein the extension package provides additional functionality for one or more of a user interface layer, an application layer, or a data storage layer of the multi-tenant computing service platform.

6. The method of claim 5, wherein the additional functionality includes one or more of an extension to a login process, a caching process, an external system communication process, or a payment processing process.

7. The method of claim 1, wherein the multi-tenant computing service platform includes or more of an enterprise-resource planning (ERP) data processing application, a customer-relationship management (CRM) data processing application, and an eCommerce data processing application.

8. A non-transitory computer-readable medium having computer executable instructions that, when executed in a computing environment by one or more electronic processors, facilitate introduction of an extension package to one or more of functions of the multi-tenant computing service platform, the instructions when executed cause the one or more electronic processors to:
receive an extension package at a multi-tenant computing service platform and receive a request to install the extension package as part of the multi-tenant computing service platform;
parse the request and the extension package to identify whether a declaration is included, wherein the declaration identifies one or more resources of the multi-tenant computing service platform to be utilized by the extension package;
if the declaration is not identified by the parsing, then reject the request to install the extension package to avoid installing an incompatible extension;
if the declaration is identified by the parsing, then proceed with the installation comprising:
identify validation instructions included with the extension package, wherein the validation instructions are executable by an electronic processor to validate operation of the extension package with regard to service platform resources on the multi-tenant computing service platform;
determine the one or more resources identified in the declaration;
operate the electronic processor to execute the validation instructions to validate operation of the extension package with regard to service platform resources on the multi-tenant computing service platform;
determine if execution of the validation instructions results in a condition with respect to a characteristic of the extension package; and
install the extension package as part of the multi-tenant computing service platform if execution of the validation instructions results in the condition.

9. The computer-readable medium of claim 8, wherein the instructions for determining if execution of the set of instructions results in a condition with respect to a characteristic of the extension package further comprises instructions for determining if execution of the set of instructions results in meeting or exceeding a threshold ratio of coverage of the code that would be executed by a use of the extension package.

10. The computer-readable medium of claim 8, wherein the instructions for determining if execution of the set of instructions results in a condition with respect to a characteristic of the extension package further comprises instructions for determining if execution of the set of instructions results in meeting or remaining less than a threshold value with respect to coverage of the resources defined by the extension package.

11. The computer-readable medium of claim 8, wherein determining if execution of the set of instructions results in a condition with respect to a characteristic of the extension package further comprises instructions for:
receiving a request to access the extension package;
determining if the request conforms to the terms of the extension package; and
processing the request if the request conforms to the terms of the extension package.

12. The computer-readable medium of claim 8, wherein the extension package provides additional functionality of one or more of a user interface layer, an application layer, or a data storage layer of the multi-tenant computing service platform.

13. The computer-readable medium of claim 8, wherein the functionality includes one or more of an extension to a login process, a caching process, an external system communication process, or a payment processing process.

14. The computer-readable medium of claim 8, further comprising instructions for:
prior to installing the extension package, determining if an overlap exists between the one or more resources identified in the declaration and a set of resources identified in declarations associated with previously installed extension packages; and
if an overlap exists, then updating a record containing data related to overlaps between the set of resources identified in declarations associated with previously installed extension packages.

15. The computer-readable medium of claim 14, wherein if an overlap exists between the one or more resources identified in the declaration and a set of resources identified in declarations associated with previously installed extension packages, then the instructions further comprise instructions for:
receiving a request to access the extension package;
accessing the record containing data related to overlaps;
determining from the record a set of validation code associated with the request;
executing the set of validation code associated with the request; and
determining if execution of the set of validation code results in a condition with respect to a characteristic of the extension package.

16. The computer-readable medium of claim 8, further comprising instructions for:
monitoring the resources of the multi-tenant computing service platform accessed when processing the request;
determining if the resources accessed when processing the request conform to those identified in the declaration; and
suspending processing of the request if the resources accessed when processing the request do not conform to those identified in the declaration.

17. A computer system having at least one electronic processor configured to execute instructions from a memory for permitting users of a multi-tenant computing service platform to introduce an extension package to one or more of the functions of the platform, the computer system comprising:
an extension package manager configured to install a proposed extension package, the extension package manager comprising instructions executable by the at least one electronic processor to cause the at least one electronic processor to:
receive the proposed extension package and receive a request to install the proposed extension package as part of the multi-tenant computing service platform;
parse the proposed extension package to identify whether a declaration is included, wherein the declaration identifies one or more resources of the multi-tenant computing service platform to be utilized by the proposed extension package;
if the declaration is not identified by the parsing, then reject the request to install the proposed extension package to avoid installing an incompatible extension;
if the declaration is identified by the parsing, then proceed with the installation comprising:
identify validation code included with the proposed extension package, wherein the validation code is executable by the at least one electronic processor to validate operation of the proposed extension package with regard to service platform resources on the multi-tenant computing service platform;
determine whether execution of the validation code associated with the proposed extension package would result in access of a resource associated with one or more other previously installed extension packages; and
determine whether execution of the validation code associated with the proposed extension package results in access of the resource identified in the declaration associated with the proposed extension package.

18. The system of claim 17, wherein the extension package manager is further configured to determine if execution of the validation code associated with the proposed extension package results a condition with respect to coverage of the code that would be executed by a use of the proposed extension package.

19. The system of claim 17, wherein the extension package manager is further configured to determine if execution of the validation code associated with the proposed extension package results a condition with respect to coverage of resources defined by the proposed extension package.

20. The system of claim 17, wherein the extension package manager is further configured to stop execution of code associated with the proposed extension package if execution of the code results in accessing a resource not in the declaration associated with the proposed extension package.

* * * * *